United States Patent
Muruganantham

(10) Patent No.: US 9,644,512 B2
(45) Date of Patent: May 9, 2017

(54) DOSING MODULE WITH INTEGRATED HEAT PIPE

(71) Applicant: Cummins Emission Solutions, Inc., Columbus, IN (US)

(72) Inventor: Karthik Muruganantham, Stoughton, WI (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/704,528

(22) Filed: May 5, 2015

(65) Prior Publication Data
US 2016/0326925 A1    Nov. 10, 2016

(51) Int. Cl.
*F02M 53/04*    (2006.01)
*F01N 3/02*    (2006.01)
*F01N 3/20*    (2006.01)
*F01N 13/18*    (2010.01)

(52) U.S. Cl.
CPC ......... *F01N 3/0205* (2013.01); *F01N 3/2066* (2013.01); *F01N 13/18* (2013.01); *F01N 2260/02* (2013.01); *F01N 2260/024* (2013.01); *F01N 2610/02* (2013.01); *F01N 2610/11* (2013.01); *F01N 2610/1453* (2013.01)

(58) Field of Classification Search
CPC ........... F01N 2260/024; F01N 2610/11; F01N 2610/1453; F01P 3/16; F01P 2003/2278; F02M 31/005; F02M 53/04; F02M 53/043; F02M 53/08; F02M 2700/007
See application file for complete search history.

(56) References Cited

U.S. PATENT DOCUMENTS

| 6,513,323 | B1 * | 2/2003 | Weigl | B01D 53/9431 |
| | | | | 137/340 |
| 2007/0092413 | A1 * | 4/2007 | Hirata | F01N 3/208 |
| | | | | 422/177 |
| 2010/0011738 | A1 * | 1/2010 | Zhang | F01D 25/12 |
| | | | | 60/39.5 |
| 2014/0260207 | A1 | 9/2014 | Shovels | |

FOREIGN PATENT DOCUMENTS

| DE | 10 2011 087 085 | | 11/2011 |
| JP | 2008261247 A | * | 10/2008 |
| JP | 2009103013 A | * | 5/2009 |
| WO | WO-2012/049175 | | 4/2012 |

OTHER PUBLICATIONS

Machine translation of JP 2008-261247 A, accessed Apr. 22, 2016.*
Machine translation of JP 2009-103013 A, accessed Apr. 22, 2016.*
European Search Report for Patent Application No. 16165777, issued Sep. 1, 2016, 8 pages.

\* cited by examiner

*Primary Examiner* — Jonathan Matthias
(74) *Attorney, Agent, or Firm* — Foley & Lardner LLP

(57) ABSTRACT

A dosing module for an exhaust aftertreatment system includes an attachment interface for coupling to an exhaust system. The attachment interface includes a heat pipe system that includes a cavity encasing a fluid. The cavity has a heat source portion thermally coupled with a portion of the attachment interface and a heat sink portion thermally coupled with a cooling system. The fluid transfers heat from the heat source portion to the heat sink portion.

19 Claims, 3 Drawing Sheets

DOSING MODULE WITH INTEGRATED HEAT PIPE

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen or water, with the aid of a catalyst and a reductant. The catalyst may be included in a catalyst chamber of an exhaust system, such as that of a vehicle or power generation unit. A reductant, such as anhydrous ammonia, aqueous ammonia or urea is typically introduced into the exhaust gas flow prior to the catalyst chamber. To introduce the reductant into the exhaust gas flow for the catalytic reduction process, an SCR system may dose or otherwise introduce the reductant through a dosing module that sprays the reductant into an exhaust pipe of the exhaust system up-stream of the catalyst. The SCR system may include one or more sensors to monitor conditions within the exhaust system.

SUMMARY

Implementations described herein relate to attachment interfaces for modules coupled to an exhaust system and passive cooling systems for the modules and/or attachment interfaces for regulating the temperature of the module and/or attachment interfaces. The attachment interfaces and/or modules may include a heat pipe system having a cavity with a fluid therein to transfer heat from a heat source to a heat sink.

One implementation relates to a dosing module that includes a dosing tip to dose reductant into an exhaust system, an attachment interface to couple the dosing module to a portion of the exhaust system, and a heat pipe system. The heat pipe system includes a cavity encasing a fluid. The cavity has a heat source portion thermally coupled with a portion of the attachment interface and a heat sink thermally coupled with a cooling system. The fluid transfers heat from the heat source portion to the heat sink portion.

In some implementations, the heat pipe system is integrated into the attachment interface. The heat source portion may be adjacent an attachment opening of the attachment interface. The cooling system may include a portion of a reductant circulating system and/or a cooling fin. In some implementations, the portion of the reductant circulating system is a surface thermally coupled with a reductant outlet of the dosing module. The fluid may be one of mercury or sodium. In some implementations, the cavity includes several heat source portions thermally coupled with several portions of the attachment interface. Each of the several heat source portions may be adjacent a corresponding attachment opening of the attachment interface.

Another implementation relates to an aftertreatment system that includes an exhaust system and a dosing module configured to dose reductant into exhaust flowing through the exhaust system. The dosing module includes an attachment interface coupled to a portion of the exhaust system and a heat pipe system. The heat pipe system includes a cavity encasing a fluid. The cavity has a heat source portion thermally coupled with a portion of the attachment interface and a heat sink portion thermally coupled with a cooling system. The fluid transfers heat from the heat source portion to the heat sink portion. In some implementations, the heat source portion is adjacent an attachment opening of the attachment interface. The cooling system may include a portion of a reductant circulating system and/or a cooling fin. The fluid may be one of mercury or sodium.

Yet a further implementation relates to an attachment interface for coupling a component to an exhaust system. The attachment interface includes a component defining one or more attachment openings for coupling the attachment interface to a portion of the exhaust system and a heat pipe system. The heat pipe system includes a cavity encasing a fluid. The cavity has a heat source portion thermally coupled with a portion of the attachment interface and a heat sink portion thermally coupled with a cooling system. The fluid transfers heat from the heat source portion to the heat sink portion. The cooling system may include a portion of a reductant circulating system and/or a cooling fin. The fluid may be one of mercury or sodium.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
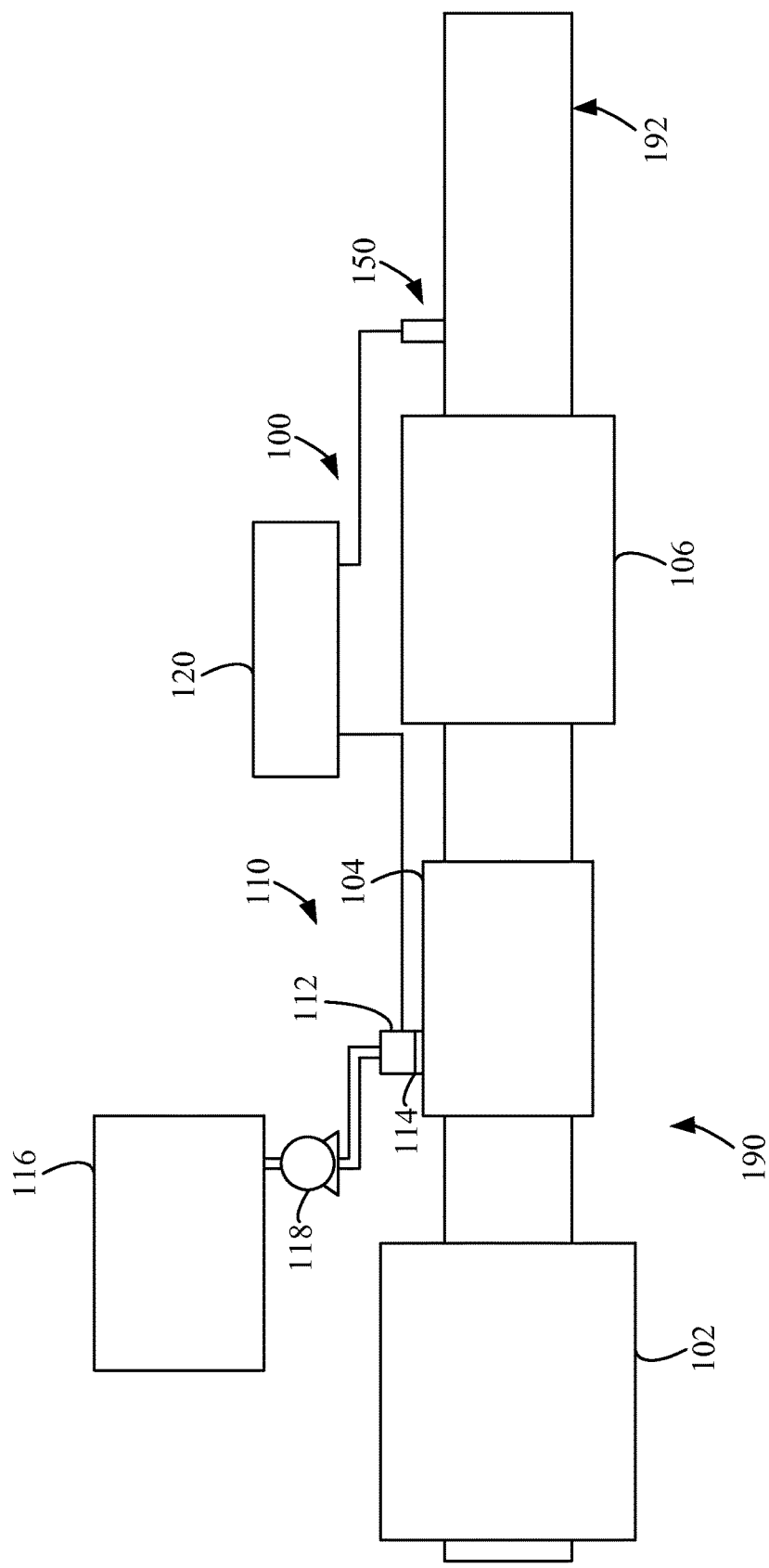
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for integrating heat pipes into a dosing module. The various concepts introduced above and discussed in greater detail below may be implemented in any of numerous ways, as the described concepts are not limited to any particular manner of implementation. Examples of specific implementations and applications are provided primarily for illustrative purposes.

I. Overview

For an aftertreatment system, a dosing module may be coupled to the exhaust system in some implementations to dose reductant into the exhaust gas flowing within the exhaust system. As exhaust gas flows through the exhaust system, the temperature of the exhaust system may increase significantly. Because the dosing module is coupled to the exhaust system, the temperature of the dosing module may be increased as well, such as through conductive heat transfer, convective heat transfer, etc. However, the dosing module may need to be maintained at a temperature below an upper temperature limit, such as below a temperature that results in the failure of electronic components of the dosing module. If the temperature of the dosing module, or interfacing portions of the dosing module that interface with the exhaust system or other components, exceeds specified upper temperature limits, then the dosing module may cease to operate. The failure of a dosing module can lead to no dosing, under-dosing, or over-dosing of reductant. This may result in increased in untreated emissions (e.g., excess $NO_x$ emissions) or excess reductant (e.g., ammonia slip) exiting the aftertreatment system. Accordingly, a performance efficient and cost effective cooling system may be useful for a dosing module to permit precise metering and prolonged operation of the dosing module even at extreme temperatures.

In particular implementations, some cooling systems utilize engine coolant to cool the dosing module by circulating part of the engine coolant through the dosing module. However, in some instances, such as for larger vehicles, heat reduction via engine coolant may become cumbersome where the dosing module may be located several meters away from the engine and/or engine coolant system. This can result in longer and more complex components, such as longer coolant lines, a more powerful coolant pump, etc. In other implementations, a passive injector mounting plate may include fins, insulating materials, and/or an air gap between the dosing module and the exhaust system interface. However, with increases in engine sizes, such mounting plates may have reduced effectiveness, which may result in the dosing module over-heating.

According to various embodiments, a cooling system is provided for the dosing module that does not need to rely on the engine coolant system, but can still effectively maintain the temperature of the dosing module below the upper temperature limits when the dosing module may fail. One such cooling system may utilize integrated heat pipes within a portion of the dosing module. The principle of operation is that the heat pipe has a simple enclosed tube and/or tubular cavity with a fluid (e.g., mercury, sodium) within the tube or cavity. The enclosed fluid on the inside evaporates at a heat source, such as an interface of the exhaust and the dosing module, of the heat pipe and transfers latent heat from the heat source to a heat sink, such as fins or a colder fluid. When the fluid evaporates, the resulting vapor flows through an interior portion of the heat pipe. As the vapor condenses at the heat sink, the resulting fluid flows back toward the heat source at an exterior portion of the heat pipe through capillary effect. The fluid vaporizes and condenses to transfer latent heat from the heat source to the heat sink.

A dosing module may include one or more integrated heat pipes within an attachment interface, such as a base and/or legs of a dosing module that couple the dosing module to the exhaust system. In some implementations, one or more heat source ends of the one or more integrated heat pipe may be positioned in attachment legs of a dosing module where the dosing module is coupled to the exhaust system. The integrated heat pipe may utilize a SCR reductant fluid line as a heat sink, such as a reductant source line or a reductant return line. In other implementations, the integrated heat pipe may utilize one or more cooling fins as a heat sink. Accordingly, the temperature of a dosing module may be regulated utilizing such integrated heat pipes.

II. Overview of Aftertreatment System

FIG. 1 depicts an aftertreatment system 100 having an example reductant delivery system 110 for an exhaust system 190. The aftertreatment system 100 includes a particulate filter, and more particularly a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia in the presence of the exhaust gas. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, electrically erasable programmable read-only memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide.

The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or six sensors 150 with each sensor 150 located at one of the foregoing positions of the exhaust system 190.

III. Example Dosing Module with a Heat Pipe System

Figure 2:
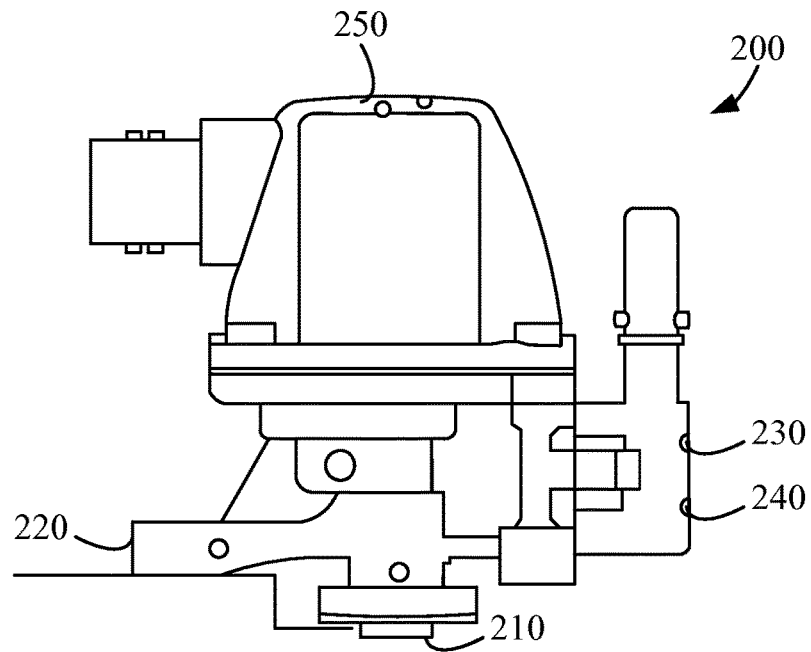
FIG. 2 is a side elevation view of an example dosing module.

FIG. 2 depicts an example dosing module 200 that includes a dosing tip 210, an attachment interface 220, a reductant inlet 230, a reductant outlet 240, and a housing 250. The dosing tip 210 is configured to dose or inject reductant, such as DEF, into an exhaust system. The dosing tip 210 and/or a portion thereof may be aligned with an opening in the exhaust system to inject reductant into the exhaust system. In some implementations, the dosing tip 210 may have a portion extending into an exhaust pipe of the exhaust system. In other implementations, the dosing tip 210 may have an end substantially aligned with a wall of the exhaust system such that the dosing tip 210 does not extend into an interior of an exhaust pipe of the exhaust system. In still other implementations, the dosing tip 210 may be spaced away from an exhaust pipe of the exhaust system, but aligned such that the dosing tip 210 injects reductant into the exhaust system. In yet other implementations, an exhaust pipe may include a chamber into which the dosing tip 210 injects reductant, but substantially reduces the amount of exhaust gas from flowing into the chamber as the exhaust gas flows through the exhaust pipe, such as a wye configuration or Y configuration for the exhaust pipe and/or a chamber extending off from an elbow.

To maintain the position of the dosing tip 210 relative to the exhaust pipe of the exhaust system, an attachment interface 220 is coupled to a portion of the exhaust pipe. The attachment interface 220 may, for example, be a cast metal component having one or more openings formed through the cast metal component for one or more attachment members to couple the attachment interface to a portion of an exhaust pipe of the exhaust system. In other implementations, the attachment interface 220 may be a milled metal component. For instance, the one or more attachment members may be one or more bolts that are inserted through the one or more openings of the attachment interface 220 to couple to tapped holes in a portion of the exhaust pipe of the exhaust system. In other instances, the one or more attachment members may be attachment straps to wrap around a portion of the exhaust pipe of the exhaust system and the attachment interface 220. In some implementations, a thermal insulator may be positioned between the attachment interface 220 and the portion of the exhaust pipe to which the dosing module 200 is attached.

The reductant inlet 230 receives reductant from a reductant source, such as a tank, and the reductant outlet 240 returns reductant that is not dosed to the reductant source. For instance, a pump may pump reductant from the reductant source to reductant inlet 230 of the dosing module 200 and the reductant outlet 240 returns any reductant that is not dosed to the reductant source, thereby circulating reductant through the dosing module 200. Such circulating of the reductant through the dosing module 200 may be used to regulate the temperature of the dosing module 200. In other implementations, the reductant outlet 240 may be omitted and a pump simply pressurizes reductant and supplies the reductant to the reductant inlet to be dosed.

The housing 250 may be a metallic or non-metallic component that encloses components of the dosing module 200, such as a dosing controller, actuators for controlling the dosing, etc. The housing 250 may be fluidly sealed to the attachment interface 220 to substantially isolate the components in the housing 250 from environmental conditions. Because the components within the housing 250 are in proximity of the attachment interface 220, the components therein may be affected by changes in temperature of the attachment interface 220. For instance, if the attachment interface 220 is heated, such as via thermal conduction and/or convection from the exhaust system, then the components within the housing 250 may also be heated. Accordingly, the temperature of the attachment interface 220 may be regulated such that heat transfer to the components within the housing 250 may also be regulated. One such feature for use in regulating the attachment interface 220 may be a heat pipe that can regulate the temperature of the attachment interface 220 by transferring heat from one or more heat sources of the attachment interface 220 to a heat sink, such as a portion of the reductant outlet return system, cooling fins, and/or another thermal cooling feature.

Figure 3:
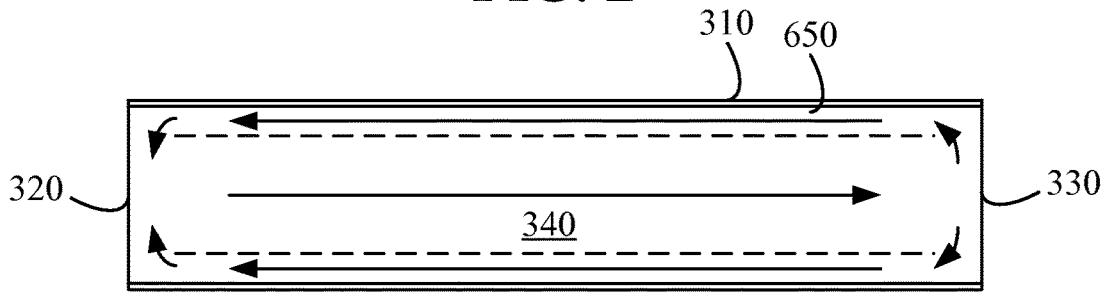
FIG. 3 is a side schematic diagram of an example heat pipe.
Figure 4:
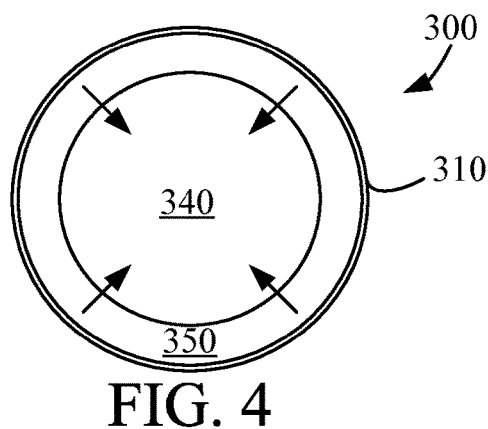
FIG. 4 is an end schematic diagram of the heat pipe of FIG. 3.

FIGS. 3-4 depict schematic diagrams of an example heat pipe 300 that may be integrated into a portion of the attachment interface 220 of the dosing module 200 of FIG. 2. The heat pipe 300 is defined by a cavity 310, such as a tube and/or a cavity formed in the attachment interface 220 of the dosing module 200 of FIG. 2, that encloses a fluid. The heat pipe 300 includes a heat source end 320 and a heat sink end 330. The heat source end 320 is positioned at a location from which thermal energy is to be transferred from, thereby reducing the temperature at that location. The heat sink end 330 is positioned at a location to which thermal energy is to be transferred to, thereby increasing the temperature at that location. To transfer the thermal energy from the heat source end 320 to the heat sink end 330, a working fluid, which may depend upon an applicable operating temperature, such as mercury, sodium, etc., fills the cavity 310. When heat is applied to the enclosed fluid at the heat source end 320, the fluid on the inside evaporates by transferring latent heat from the heat source to turn into a vapor. The vapor travels through an interior portion 340 of the cavity 310 towards the heat sink. As the vapor cools at the heat sink end 330, the fluid condenses into a liquid form and returns via an outer portion 350 toward the heat source end 320. The fluid then evaporates and the cycle repeats to transfer heat from the heat source to the heat sink. FIG. 4 depicts a schematic diagram showing the liquid from the outer portion 350 evaporating and returning to the inner portion 340 at the heat source end 320 to transfer heat toward the heat sink end 330.

Such a heat pipe 300 may be integrated into portions of the dosing module 200 of FIG. 2 to directly regulate the temperature of one or more components, such as electronic components, and/or the heat pipe 300 may be integrated into the attachment interface 220 to regulate the temperature of the attachment interface 220 and, thereby also regulate the temperature of one or more components of the dosing module 200.

Figure 5:
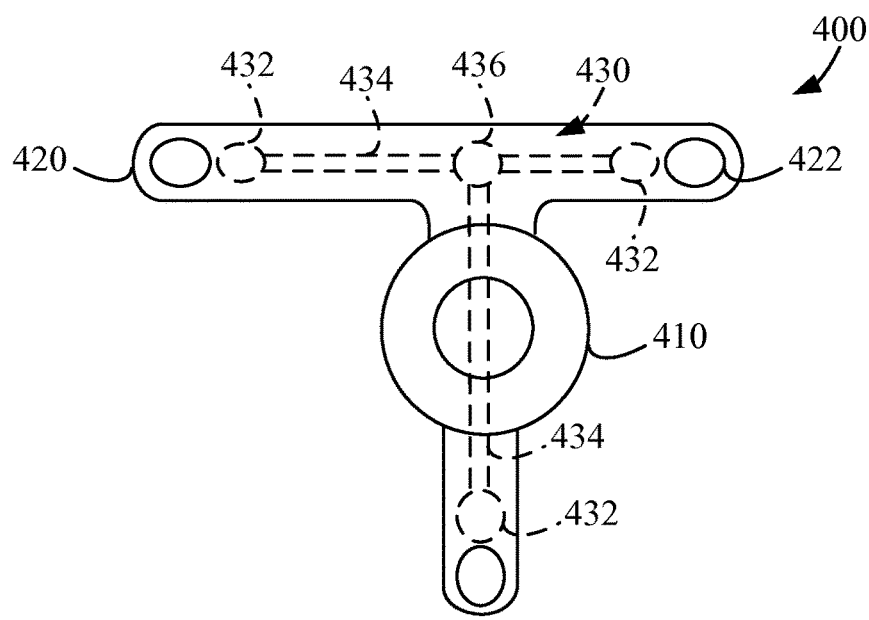
FIG. 5 is a bottom view of an example attachment interface having integrated heat pipes.

FIG. 5 depicts a bottom view of an example dosing module 400 showing a dosing tip 410 and an attachment interface 420. The dosing module 400 may be constructed substantially in accordance with the dosing module 200 of FIG. 2. The attachment interface 420 includes one or more attachment openings 422 for coupling the dosing module 400 to a portion of an exhaust system. For instance, one or more attachment members, such as bolts, may be inserted through a corresponding attachment opening 422 to couple the dosing module 400 to the exhaust system. In other implementations, other attachment members may be used, such as straps, clamps, clips, etc.

The attachment interface 420 includes an integrated heat pipe system 430 (shown in phantom) that contains a working fluid, such as mercury, sodium, etc., to transfer latent heat from a heat source portion 432 (shown in phantom) to a heat sink portion 436 (shown in phantom) via a heat pipe cavity 434 (shown in phantom). In the example shown, three heat source portions 432 are positioned near to and/or adjacent to the attachment openings 422; however, any number of heat source portions 432 may be included in the attachment interface 420. The heat source portions 432 are positioned adjacent and/or near to the attachment openings 422 to transfer heat that is imparted from the exhaust system to the attachment interface 420 via the attachment members coupling the dosing module 400 to the exhaust system. That is, heat may be conducted to the attachment members from the exhaust system due to the attachment members coupling to and/or contacting a portion of the exhaust system. The heat conducted to the attachment members is transferred to the attachment interface 420 via the interface of the attachment members with the attachment openings 422 (e.g., a bolt coupled to a portion of the exhaust system and inserted through the attachment openings 422 may transfer heat to the attachment interface 420 via conduction, convection, etc.). Thus, positioning the heat source portions 432 adjacent and/or near to the attachment openings 422 provides the heat source portions 432 closest to the source of heat being transferred to the attachment interface 420. Of course, the heat source portions 432 may be located at other areas of the attachment interface 420 and/or the dosing module 400 from where heat is to be transferred.

Each of the heat source portions 432 is in fluid communication with a corresponding heat pipe cavity 434, which is in fluid communication with the heat sink portion 436. The heat pipe cavities 434 are cavities formed in the attachment interface 420 through which thermal energy can be transferred via fluid within the heat pipe system 430. The heat pipe cavities 434 may have a circular, ovular, ovoid, square, triangular, and/or other geometric cross-sectional configuration. In some implementations, such as shown in FIG. 5, a single heat sink portion 436 may be utilized to receive the thermal heat from the heat source portions 432 via the heat pipe cavities 434. In other implementations, several heat sink portions 436 may be used, such as a corresponding heat sink portion 436 for each heat source portion 432 and heat pipe cavity 434.

In some implementations, the heat sink portion 436 may be in fluid communication with a surface that is in thermal contact with a doser reductant outlet (not shown) and/or a portion of a reductant circulating system of the dosing module 400. That is, the heat sink portion 436 may abut a cavity through which reductant of the reductant outlet flows, thereby transferring the latent heat of the fluid within the integrated heat pipe system 430 to the reductant flowing through the reductant circulating system via thermal conduction. It should be understood that the working fluid within the integrated heat pipe system 430 does not flow into the reductant circulating system. In other implementations, the heat sink portion 436 may be in thermal conductivity with a reductant source, such as a reductant tank.

When heat is transferred from the exhaust system to the attachment interface 420, such as via attachment members through the attachment openings 422, heat may be conducted to the heat source portions 432. The fluid within the integrated heat pipe system 430 evaporates at the heat source portions 432 and the vapor travels within the heat pipe cavities 434 to a heat sink portion 436. At the heat sink portion 436, the vapor condenses, transferring heat to a cooling system, such as reductant flowing through a reductant circulating system, a reductant source, etc. The liquid fluid in the integrated heat pipe system 430 returns to the heat source portions 432 via the heat pipe cavities 434 to transfer heat from the attachment interface 420 again. Thus, the temperature of the dosing module 400 can be regulated via the integrated heat pipe system 430 by transferring heat from the exhaust system to a heat sink portion 436. Such temperature regulation may prevent and/or substantially reduce the likelihood of components of the dosing module 400 from failing due to overheating.

Figure 6:
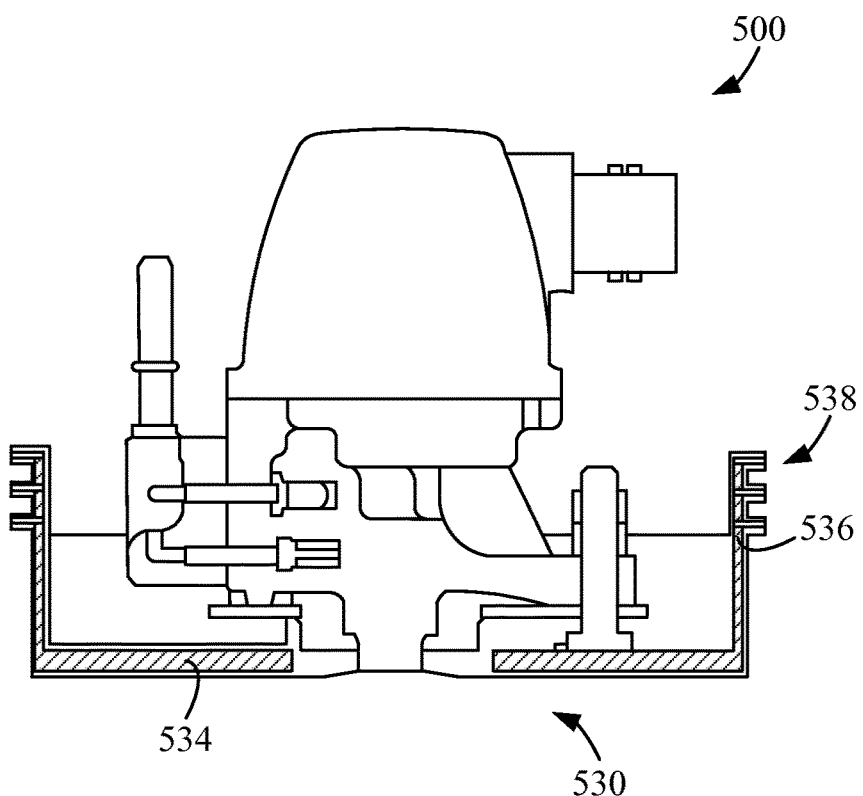
FIG. 6 is a partial side cross-sectional view of an example dosing module having integrated heat pipes coupled to cooling fins.

In some implementations, the heat sink portion 436 may be in thermal contact with cooling fins, either in addition to the reductant circulating system or in lieu of the reductant circulating system. For example, FIG. 6 depicts an implementation of a dosing module 500 having an integrated heat pipe system 530 with heat pipe cavities 534 in fluid communication with heat sink portions 536 that include a plurality of cooling fins 538. The cooling fins 538 increase the exposed surface area of the heat sink portion 536 such that convective cooling of the fluid within the integrated heat pipe system 530 occurs. In some implementations, the cooling fins 538 may be located on the dosing module 500. In other implementations, the cooling fins 538 may be remotely located from the dosing module 500.

In some implementations, the heat pipes of the heat pipe systems 400, 500 of FIGS. 5-6 may be separate from the dosing module 400, 500, such as a separate structure with heat pipes that are thermally coupled with one or more portions of the dosing modules 400, 500 and a cooling system. For instance, a heat pipe system may include heat pipes that each has a heat source end that abuts the attachment interface near each respective attachment opening to transfer heat to fluid within each of the heat pipes. The heat pipes may each have a heat sink end that transfers heat to a cooling system, such as via conducting thermal heat to reductant flowing through a reductant circulating system. In some implementations, a single heat sink end may be implemented and the heat pipes may converge and/or combine at the heat sink end.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation, and features from one combination can be combined with features in another combination in accordance with the understanding of one of ordinary skill in the art. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. When the language "at least a portion" and/or "a portion" is used the item can include a portion and/or the entire item unless specifically stated to the contrary.

What is claimed is:

1. A dosing module comprising:
    a dosing tip configured to dose reductant into an exhaust system;
    an attachment interface configured to couple the dosing module to a portion of the exhaust system, the attachment interface including an attachment opening through which an attachment member is inserted to couple the attachment interface to the portion of the exhaust system; and
    a heat pipe system including a cavity encasing a fluid entirely within the attachment interface, the cavity having a heat source portion near to the attachment opening and thermally coupled with a first portion of the attachment interface and a heat sink portion thermally coupled with a surface of the attachment interface for a cooling system, the fluid transferring heat from the heat source portion to the heat sink portion.

2. The dosing module of claim 1, wherein the heat pipe system is integrated into the attachment interface.

3. The dosing module of claim 1, wherein the heat source portion is adjacent to an opening of the attachment interface.

4. The dosing module of claim 1, wherein the cooling system includes a portion of a reductant circulating system in thermal conduction with the surface of the attachment interface.

5. The dosing module of claim 4, wherein the portion of the reductant circulating system is a surface thermally coupled with a reductant outlet of the dosing module.

6. The dosing module of claim 1, wherein the cooling system includes a cooling fin.

7. The dosing module of claim 1, wherein the fluid comprises one of mercury or sodium.

8. The dosing module of claim 1, wherein the cavity includes a plurality of heat source portions thermally coupled with a plurality of portions of the attachment interface.

9. The dosing module of claim 8, wherein each of the plurality of heat source portions are adjacent a corresponding opening of the attachment interface.

10. An aftertreatment system comprising:
    an exhaust system; and
    a dosing module configured to dose reductant into exhaust flowing through the exhaust system, the dosing module comprising:
        an attachment interface coupled to a portion of the exhaust system, the attachment interface including an attachment opening through which an attachment member is inserted to couple the attachment interface to the portion of the exhaust system; and
        a heat pipe system including a cavity encasing a fluid entirely within the attachment interface, the cavity having a heat source portion near to the attachment opening and thermally coupled with a first portion of the attachment interface and a heat sink portion thermally coupled with a surface of the attachment interface for a cooling system, the fluid transferring heat from the heat source portion to the heat sink portion.

11. The aftertreatment system of claim 10, wherein the heat source portion is adjacent an opening of the attachment interface.

12. The aftertreatment system of claim 10, wherein the cooling system includes a portion of a reductant circulating system in thermal conduction with the surface of the attachment interface.

13. The aftertreatment system of claim 10, wherein the cooling system includes a cooling fin.

14. The aftertreatment system of claim 10, wherein the fluid comprises one of mercury or sodium.

15. The aftertreatment system of claim 10, wherein the cooling system includes a portion of a reductant circulating system and a cooling fin.

16. An attachment interface for coupling a component to an exhaust system comprising:

a component defining one or more attachment openings for coupling the attachment interface to a portion of the exhaust system, each of the one or more attachment openings configured to have an attachment member inserted therethrough to couple the component to the portion of the exhaust system; and a heat pipe system including a cavity encasing a working fluid entirely within the attachment interface, the cavity having a heat source portion thermally coupled with the one or more attachment openings and a heat sink portion configured to be thermally coupled with a surface of the attachment interface for a cooling system, the working fluid transferring heat from the heat source portion to the heat sink portion.

17. The attachment interface of claim 16, wherein the cooling system includes a portion of a reductant circulating system.

18. The attachment interface of claim 16, wherein the cooling system includes a cooling fin.

19. The attachment interface of claim 16, wherein the fluid comprises one of mercury or sodium.

* * * * *